March 6, 1951      W. W. FARIS      2,543,839
CONTAINER
Filed Jan. 26, 1946
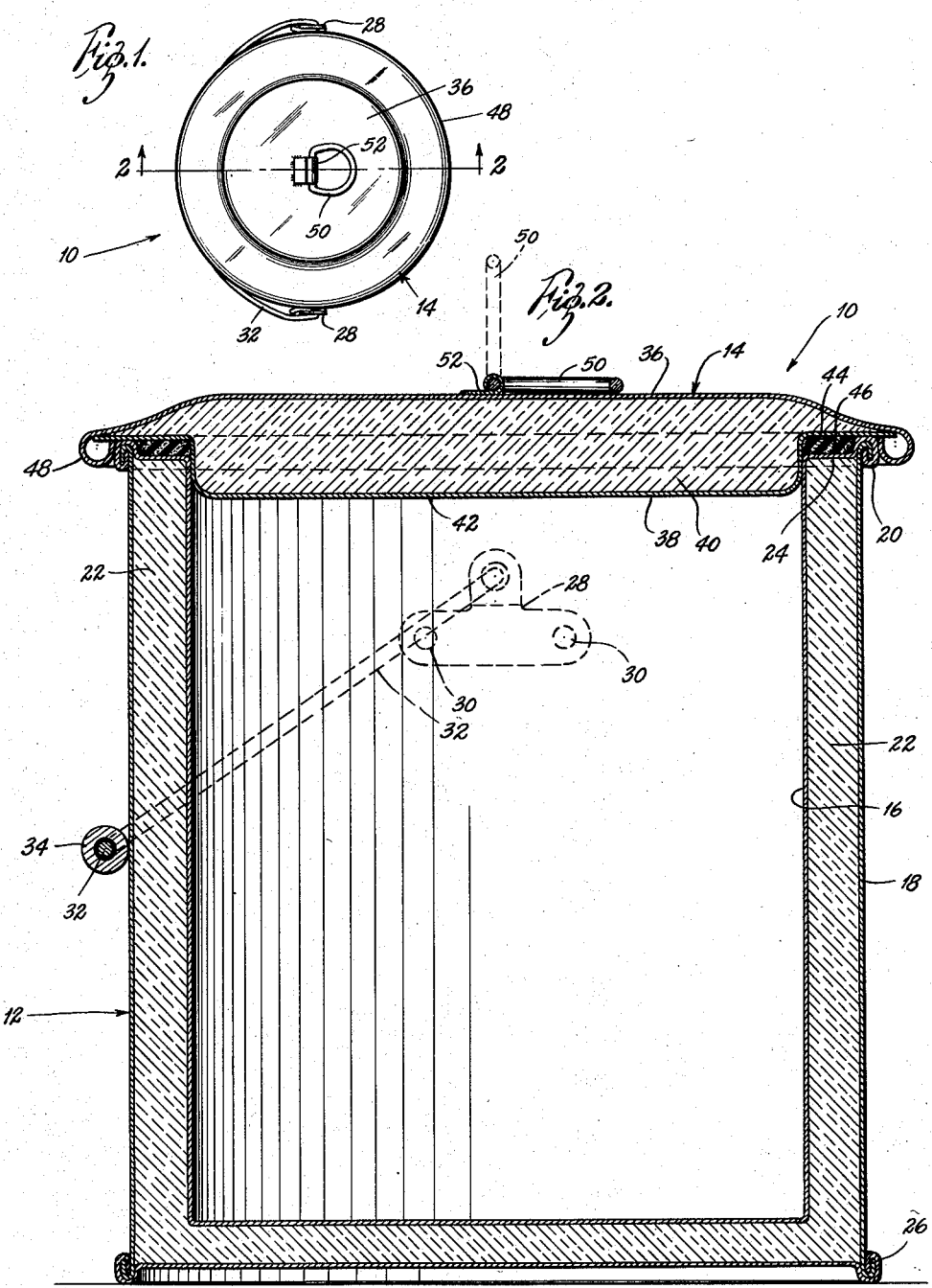
INVENTOR:
WILLIAM W. FARIS,
By Kingsland, Rogers & Ezell
ATTORNEYS.

Patented Mar. 6, 1951

2,543,839

UNITED STATES PATENT OFFICE 2,543,839

CONTAINER

William W. Faris, Webster Groves, Mo.

Application January 26, 1946, Serial No. 643,719

1 Claim. (Cl. 220—9)

The present invention relates generally to containers, and more particularly to an insulated container of the type adapted for outside service.

It is an object of the present invention to provide a novel insulated container which is adapted to receive items, such as milk or the like, and to maintain the same at substantially received temperature for a period of time.

Another object is to provide a novel insulated container incorporating structural features adapted to protect the interior thereof from rain, sleet and the like, and the cover from freezing to the body of the container.

Other objects are to provide a novel insulated container which is sturdy in construction, which includes a relatively large receiving volume, which is economical to manufacture, which is simple to fabricate, and which is adapted to a variety of uses.

The foregoing and other objects and advantages are apparent from the following description taken with the accompanying drawing, in which:

Fig. 1 is a top plan view of a container constructed in accordance with the teachings of the present invention; and Fig. 2 is an enlarged vertical cross-sectional view taken on the line 2—2 of Fig. 1.

Referring to the drawing more particularly by reference numerals, 10 indicates generally a container constructed to embody the principles of the present invention. Broadly, the container 10 includes a main body or can portion 12 and a cover 14.

The main body portion 12, which may be of heavy galvanized steel or other suitable material, comprises an inner casing 16 and an outer casing 18 which are secured together along the top edges by a standard interlocking roll connection 20. The casings 16 and 18 are spaced apart as shown in Fig. 2 and include therebetween insulating material 22 of any suitable selected kind. The casing 16 is shown as of integral construction with a top annular flange 24. The outer casing 18 is shown as of two-piece construction secured together at 26 by a standard rolled interlocking connection. Diametrically opposed brackets 28 are secured to the outer casing 18 by brads or rivets 30 and receive a handle for the container 10 in the form of a bail 32 having a hand-grasping element 34 centrally thereof.

The cover 14, which may be of heavy galvanized steel or other suitable material, comprises upper and lower spaced circular members 36 and 38, respectively, having insulating material 40 therebetween. The lower member 38 is formed to provide a portion 42 which extends into the body portion 12 when disposed thereon, as is shown in Fig. 2. The lower member 38 also includes a horizontal annular flange 44 to which is secured a sealing member 46 of rubber, or the like, which is adapted to seat on the flange 24. The upper and lower members 36 and 38 are secured together at their outer edges in a manner to provide a depending annular bead 48 which is adapted to lie adjacent to the annular roll connection 20 and to extend well below the top thereof to form a shield against wind-driven rain, and the like. A lifting ring 50 is pivotally connected to a member 52 which is welded or otherwise secured to the center of the outer member 36.

It is manifest from the foregoing that there has been provided an insulated container which is adapted for a number of uses. The container is of sturdy weatherproof construction and finds particular use as a receiving container for milk and other dairy products to protect the products from the elements and from prowling animals. The insulating construction makes the container useful in keeping the received items cool.

The annular seal 46 cooperates with the insulating materials 22 and 40 to maintain a given temperature within the container 10. The annular bead 48 assists in weatherproofing the container and is particularly advantageous in preventing any water from getting between the cover 14 and the body portion 12, which in freezing weather would freeze the cover 14 to the body portion 12.

It is clear from the foregoing that there has been provided a container which fulfills all of the objects and advantages sought therefor. It is to be understood that the description and the accompanying drawing have been given by way of illustration and example, and that those modifications and changes apparent to those skilled in the art are contemplated as within the scope of the invention, which is limited only by the claim which follows.

What is claimed is:

In combination, an outside service container comprising spaced inner and outer casings secured together only at the top edges, each casing including a vertical wall, said inner casing being of integral construction and being secured to the outturned edge of the vertical wall of the outer casing in the form of a bead having structural stiffness disposed exteriorly of the plane of the vertical wall of the outer casing, said inner casing being formed with a horizontal continuous flange between its vertical wall and the bead, said flange being in a plane below the horizontal plane of the bead, insulating material between the inner and outer casings, a cover including spaced upper and lower members, insulation between said members, said upper member having a depending annular bead formed at the periphery thereof, said depending bead having an arcuate portion extending downwardly, inwardly, and upwardly, and ending in a straight vertical portion, the radius of said arcuate portion being sufficiently large to provide a degree of resilient movement of said straight portion both vertically and laterally, said resilient lateral movement being for the purpose of providing frictional engagement between said vertical portion and the outwardly disposed side of said first mentioned bead when said cover is in closing position, said lower member including a horizontal continuous flange and a central downwardly offset portion formed to extend into the inner casing when said cover is in closing position, said offset portion being connected to said flange by a vertical continuous portion, said depending bead of said upper member receiving the continuous flange of said lower member in clamping relation as provided by said resilient vertical movement of said vertical portion of said depending bead, and a sealing member disposed on said flange of said inner casing engaged by said flange of said lower member when said cover is in closing position.

WILLIAM W. FARIS.

REFERENCES CITED

The following references are of record in the file of this patent:

UNITED STATES PATENTS

| Number | Name | Date |
|---|---|---|
| 430,394 | Muller | June 17, 1890 |
| 968,971 | Peck | Aug. 30, 1910 |
| 1,157,991 | Linton | Oct. 26, 1915 |
| 1,200,748 | Munger | Oct. 10, 1916 |
| 1,520,907 | Marbach | Dec. 30, 1924 |
| 1,550,581 | Sherwood | Aug. 18, 1925 |
| 2,301,657 | Hlavaty | Nov. 10, 1942 |

FOREIGN PATENTS

| Number | Country | Date |
|---|---|---|
| 727,859 | France | Apr. 4, 1932 |